(12) United States Patent
Cooling et al.

(10) Patent No.: US 11,703,105 B2
(45) Date of Patent: *Jul. 18, 2023

(54) FRICTION TUBES

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US); David S. Behling, Belvidere, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,663

(22) Filed: Nov. 16, 2021

(65) Prior Publication Data

US 2022/0163092 A1    May 26, 2022

Related U.S. Application Data

(63) Continuation of application No. 16/953,723, filed on Nov. 20, 2020, now Pat. No. 11,320,022.

(51) Int. Cl.
*F16F 15/129* (2006.01)
(52) U.S. Cl.
CPC .................. *F16F 15/129* (2013.01)
(58) Field of Classification Search
CPC .................................................. F16F 15/129
See application file for complete search history.

(56) References Cited

U.S. PATENT DOCUMENTS

| | | | |
|---|---|---|---|
| 4,411,637 | A | 10/1983 | Rauch |
| 4,605,386 | A | 8/1986 | Harris |
| 7,214,135 | B2 | 5/2007 | Laskey et al. |
| 8,286,764 | B2 | 10/2012 | Weber et al. |
| 8,376,868 | B2 | 2/2013 | Hagino |

(Continued)

FOREIGN PATENT DOCUMENTS

| | | |
|---|---|---|
| DE | 3740756 A1 | 6/1989 |
| DE | 102014207724 A1 | 10/2014 |

OTHER PUBLICATIONS

Extended European Search Report dated May 2, 2022, issued during the prosecution of European Patent Application No. EP21209659.8.

*Primary Examiner* — Vicky A Johnson
(74) *Attorney, Agent, or Firm* — Locke Lord LLP; Joshua L. Jones; Scott D. Wofsy

(57) ABSTRACT

A torsion shaft assembly includes a torque carrying shaft including a driven end configured for receiving torque input to the torque carrying shaft and a driving end configured for outputting torque output from the toque carrying shaft. The torque carrying shaft includes an axial facing damping interface surface axially between the driven end and the driving end. A friction tube is disposed outboard of the torque carrying shaft. The friction tube is connected at a first axial location to be driven by the torque carrying shaft. The friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft.

15 Claims, 3 Drawing Sheets

(56) References Cited

U.S. PATENT DOCUMENTS

| | | |
|---|---|---|
| 8,702,076 B2 | 4/2014 | Cicenas |
| 8,998,732 B2 | 4/2015 | Eichinger |
| 10,054,167 B2 | 8/2018 | Piorkowski et al. |
| 11,320,022 B1 * | 5/2022 | Cooling .................. F16D 7/024 |
| 2006/0011429 A1 | 1/2006 | Park et al. |
| 2006/0276250 A1 | 12/2006 | Tkacik et al. |
| 2016/0097420 A1 | 4/2016 | Grimmer et al. |

* cited by examiner

FRICTION TUBES

CROSS-REFERENCE TO RELATED APPLICATIONS

This is a continuation of U.S. patent application Ser. No. 16/953,723 filed Nov. 20, 2020 the content of which is incorporated by reference herein in its entirety.

BACKGROUND

1. Field

The present disclosure relates to torque bearing shafts, and more particularly to dampening for torque bearing shafts.

2. Description of Related Art

Torsion shafts can undergo vibration which can limit the useable life of the torsion shafts. Among the vibrations are those that act in the angular or circumferential direction. Traditionally, a torsion shaft must be designed to have enough mass to handle the angular vibrations for the entire useable life of the torsion shaft.

The conventional techniques have been considered satisfactory for their intended purpose. However, there is an ever present need for improved systems and methods for handling vibrations in torsion shafts. This disclosure provides a solution for this need.

SUMMARY

A torsion shaft assembly includes a torque carrying shaft including a driven end configured for receiving torque input to the torque carrying shaft and a driving end configured for outputting torque output from the toque carrying shaft. The torque carrying shaft includes an axial facing damping interface surface axially between the driven end and the driving end. A friction tube is disposed outboard of the torque carrying shaft. The friction tube is connected at a first axial location to be driven by the torque carrying shaft. The friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft.

A helical spring can be engaged with the friction tube on a driven end of the friction tube to bias the friction tube toward the damping interface. The friction tube can be engaged with drive flats of the toque carrying shaft. The drive flats of the torque carrying shaft can be more proximate the driven end of the torque carrying shaft than to the driving end. The torque carrying shaft and the friction tube can be at least ten times longer than a distance from the driven end of the torque carrying shaft to the drive flats taken in an axial direction. The drive flats of the torque carrying shaft can be defined as facets in a radially extending flange of the torque carrying shaft.

The axial facing damping interface surface of the torque carrying shaft can be defined on a radially extending flange of the torque carrying shaft. The radially extending flange can be more proximate the driving end than the driven end. The torque carrying shaft and the friction tube can be at least ten times longer than a distance from the driving end of the torque carrying shaft to the radially extending flange taken in an axial direction.

The torque carrying shaft can be hollow defining a fluid passage therethrough. The torque carrying shaft can include one or more bores defined radially therethrough from the fluid passage to an annular space between the torque carrying shaft and the friction tube for passage of fluids between the fluid passage and the annular space. The friction tube can include one or more bores defined radially therethrough from the annular space to an exterior of the friction tube for passage of fluids between the annular space and the exterior.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
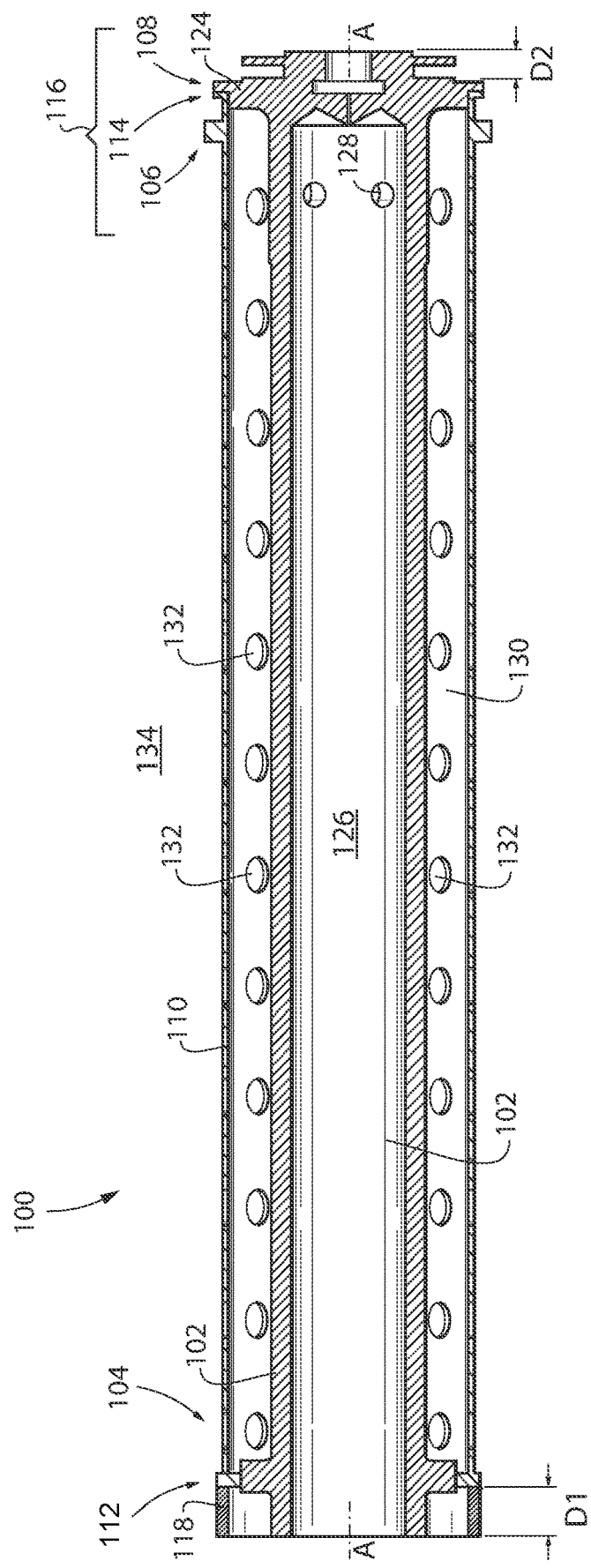
FIG. 1 is a cross-sectional side-elevation view of an embodiment of a torsion shaft assembly constructed in accordance with the present disclosure, showing the torque carrying shaft and the friction tube.

Reference will now be made to the drawings wherein like reference numerals identify similar structural features or aspects of the subject disclosure. For purposes of explanation and illustration, and not limitation, a partial view of an embodiment of a torsion shaft assembly in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to dampen angular vibration in torque shafts.

A torsion shaft assembly 100 includes a torque carrying shaft 102 including a driving end 106 configured for receiving torque input to the torque carrying shaft 102 and a driven end 104 configured for outputting torque output from the toque carrying shaft 102. The torque carrying shaft 102 includes an axial facing damping interface surface 108 (labeled in FIG. 3) axially between the driven end 104 and the driving end 106. A friction tube 110 is disposed outboard of the torque carrying shaft 102. The friction tube 110 is connected at a first axial location 112 to be driven by the torque carrying shaft 102. The friction tube 110 includes an axial facing damping interface surface 114 that abuts the axial facing damping interface surface 108 of the torque carrying shaft 102, forming a damping interface 116 to provide frictional dampening against angular vibrations occurring as differential angular displacement about rotational axis A between the driven end 104 and the driving end 106 of the torque carrying shaft 102.

Figure 2:
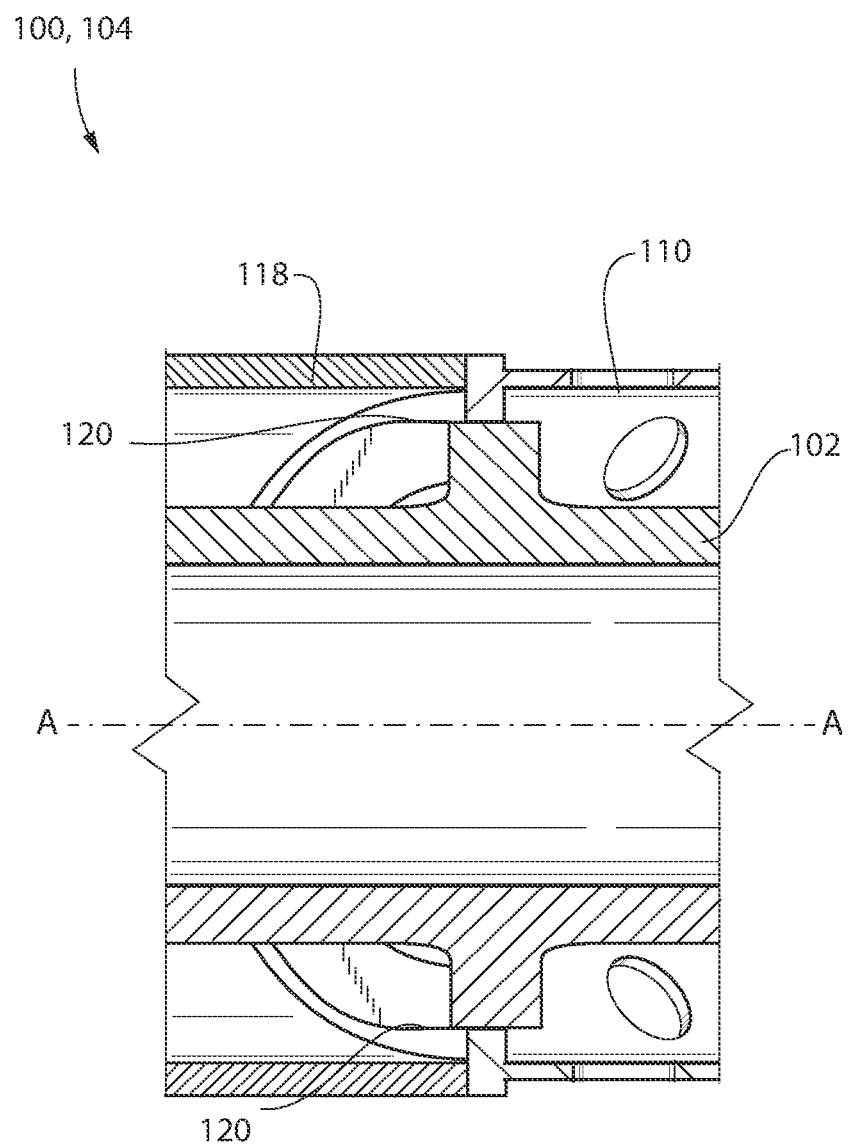
FIG. 2 is a cross-sectional side-elevation view of a portion of the torsion shaft assembly of FIG. 1, showing the drive flats.
Figure 3:
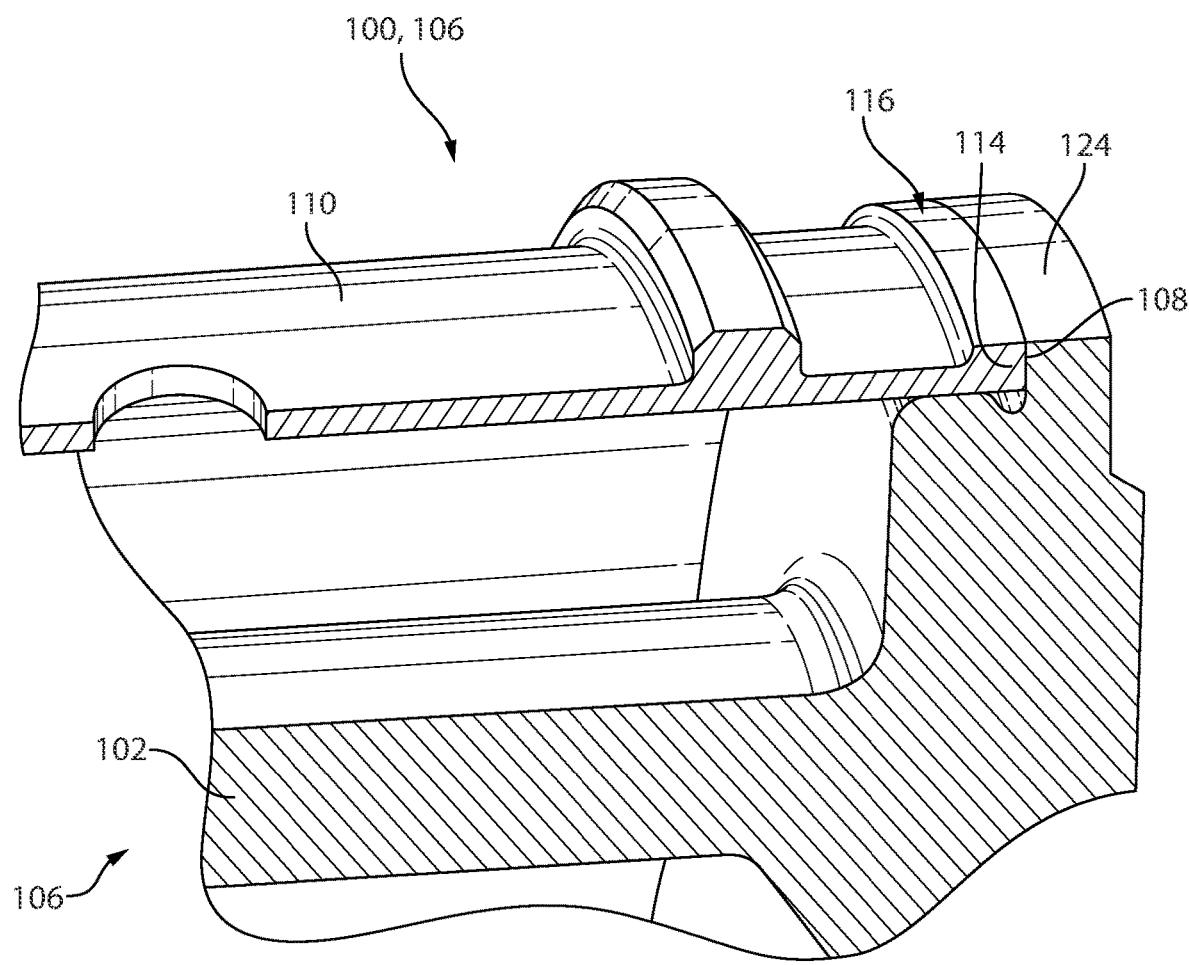
FIG. 3 is a cross-sectional side-elevation view of a portion of the torsion shaft assembly of FIG. 1, showing the friction interface.

A helical spring 118 can be engaged with the friction tube 110 on the driven end 104 of the friction tube 110 to bias the friction tube 110 toward the damping interface 116 of FIG. 3, i.e. pushing the friction tube 110 to the right along the rotational axis A as oriented in FIG. 2. As shown in FIG. 2, the friction tube 110 is engaged with drive flats 120 of the toque carrying shaft 102. The drive flats 120 of the torque carrying shaft 102 are more proximate the driven end 104 of the torque carrying shaft 102 than to the driving end 106. As shown in FIG. 1, the torque carrying shaft 102 and the friction tube 110 are at least ten times longer (in the axial direction of the rotational axis A) than a distance D1 from the driven end 104 of the torque carrying shaft 102 to the drive flats 120. The drive flats 120 of the torque carrying shaft 102 are defined as facets in a radially extending flange 122 of the torque carrying shaft 102.

With reference now to FIG. 3, the axial facing damping interface surface 108 of the torque carrying shaft 102 is defined on a radially extending flange 124 of the torque carrying shaft 102. The radially extending flange 124 is more proximate the driving end 106 than the driven end 104 (each end 106, 104 is shown in FIG. 1). As shown in FIG. 1, the torque carrying shaft 102 and the friction tube 110 are at least ten times longer than a distance D2 from the driving end 106 of the torque carrying shaft 102 to the radially extending flange 124 taken in the axial direction.

With reference again to FIG. 1, the torque carrying shaft 102 is hollow defining a fluid passage 126 therethrough. The torque carrying shaft 102 includes one or more bores 128 defined radially therethrough from the fluid passage 126 to an annular space 130 between the torque carrying shaft 102 and the friction tube 110 for passage of fluids between the fluid passage 126 and the annular space 130. The friction tube 110 includes one or more bores 132 defined radially therethrough from the annular space 130 to an exterior 134 of the friction tube 110 for passage of fluids between the annular space 130 and the exterior 134.

Systems and methods as disclosed herein can allow for dampening angular vibrations in torsion shafts. Torsion shafts with vibration dampening as disclosed herein can be reduced in mass and still manage the same loads and useful life time as more massive traditional torsion shafts without such dampening.

The methods and systems of the present disclosure, as described above and shown in the drawings, provide for angular vibration damping in torque carrying shafts. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and
a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft, wherein the friction tube is engaged with drive flats of the toque carrying shaft, wherein the drive flats of the torque carrying shaft are more proximate the driven end of the torque carrying shaft than to the driving end.

2. The torsion shaft assembly as recited in claim 1, further comprising a helical spring engaged with the friction tube to bias the friction tube toward the damping interface.

3. The torsion shaft assembly as recited in claim 1, wherein the drive flats of the torque carrying shaft are defined as facets in a radially extending flange of the torque carrying shaft.

4. The torsion shaft assembly as recited in claim 1, wherein the axial facing damping interface surface of the torque carrying shaft is defined on a radially extending flange of the torque carrying shaft.

5. The torsion shaft assembly as recited in claim 4, wherein the radially extending flange is more proximate the driven end than the driving end.

6. The torsion shaft assembly as recited in claim 1, wherein the friction tube is engaged with drive flats of the toque carrying shaft, wherein the drive flats of the torque carrying shaft are defined as facets in a first radially extending flange of the torque carrying shaft, wherein the axial facing damping interface surface of the torque carrying shaft is defined on a second radially extending flange of the torque carrying shaft.

7. The torsion shaft assembly as recited in claim 6, further comprising a helical spring engaged with the friction tube on a driven end of the friction tube to bias the friction tube toward the damping interface.

8. The torsion shaft assembly as recited in claim 1, wherein no portion of the torque carrying shaft is radially bigger than a radially largest extend of the friction tube.

9. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and
a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft, wherein the friction tube is engaged with drive flats of the toque carrying shaft, wherein the torque carrying shaft and the friction tube are at least ten times longer than a distance from the driven end of the torque carrying shaft to the drive flats taken in an axial direction.

10. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft, wherein the axial facing damping interface surface of the torque carrying shaft is defined on a radially extending flange of the torque carrying shaft, wherein the radially extending flange is more proximate the driven end than the driving end, wherein the torque carrying shaft and the friction tube are at least ten times longer than a distance from the driving end of the torque carrying shaft to the radially extending flange taken in an axial direction.

11. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and
a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft, wherein the torque carrying shaft is hollow defining a fluid passage therethrough.

12. The torsion shaft assembly as recited in claim 11, wherein the torque carrying shaft includes one or more bores defined radially therethrough from the fluid passage to an annular space between the torque carrying shaft and the friction tube for passage of fluids between the fluid passage and the annular space.

13. The torsion shaft assembly as recited in claim 12, wherein the friction tube includes one or more bores defined radially therethrough from the annular space to an exterior of the friction tube for passage of fluids between the annular space and the exterior.

14. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and
a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft, wherein the friction tube is engaged with drive flats of the toque carrying shaft, wherein the drive flats of the torque carrying shaft are defined as facets in a first radially extending flange of the torque carrying shaft, wherein the axial facing damping interface surface of the torque carrying shaft is defined on a second radially extending flange of the torque carrying shaft, wherein the torque carrying shaft and the friction tube are at least ten times longer than a distance from the driven end of the torque carrying shaft to the drive flats taken in an axial direction and are at least ten times longer than a distance from the driving end of the torque carrying shaft to the radially extending flange taken in an axial direction.

15. A torsion shaft assembly comprising:
a torque carrying shaft including a driven end configured for receiving torque input to the torque carrying shaft and a driving end configured for outputting torque output from the toque carrying shaft and from the torsion shaft assembly, wherein the torque carrying shaft includes an axial facing damping interface surface axially between the driven end and the driving end; and
a friction tube disposed outboard of the torque carrying shaft, wherein the friction tube is connected at a first axial location to be driven by the torque carrying shaft, and wherein the friction tube includes an axial facing damping interface surface that abuts the axial facing damping interface surface of the torque carrying shaft, forming a damping interface to provide frictional dampening against angular vibrations occurring as differential angular displacement between the driven end and the driving end of the torque carrying shaft; and
a helical spring engaged with the friction tube on a driven end of the friction tube to bias the friction tube toward the damping interface, wherein the helical spring is axially outside of the friction tube.

* * * * *